Dec. 29, 1953  R. L. MARTIN  2,664,067
CAPACITOR COATING MACHINE
Filed March 13, 1951  9 Sheets-Sheet 1

INVENTOR.
ROBERT LORING MARTIN
BY
Ostrolenk & Faber
ATTORNEYS

Dec. 29, 1953     R. L. MARTIN     2,664,067
CAPACITOR COATING MACHINE
Filed March 13, 1951     9 Sheets-Sheet 2

INVENTOR,
ROBERT LORING MARTIN
BY
Ostrolenk & Faber
ATTORNEYS

Dec. 29, 1953   R. L. MARTIN   2,664,067
CAPACITOR COATING MACHINE
Filed March 13, 1951   9 Sheets-Sheet 3

INVENTOR.
ROBERT LORING MARTIN
BY
Ostrolenk & Faber
ATTORNEYS

Dec. 29, 1953    R. L. MARTIN    2,664,067
CAPACITOR COATING MACHINE
Filed March 13, 1951    9 Sheets-Sheet 4

INVENTOR.
ROBERT LORING MARTIN
BY
Ostrolenk & Faber
ATTORNEYS

Dec. 29, 1953 R. L. MARTIN 2,664,067
CAPACITOR COATING MACHINE
Filed March 13, 1951 9 Sheets-Sheet 5

INVENTOR.
ROBERT LORING MARTIN
BY
Ostrolenk & Faber
ATTORNEYS

Dec. 29, 1953   R. L. MARTIN   2,664,067
CAPACITOR COATING MACHINE
Filed March 13, 1951   9 Sheets-Sheet 6
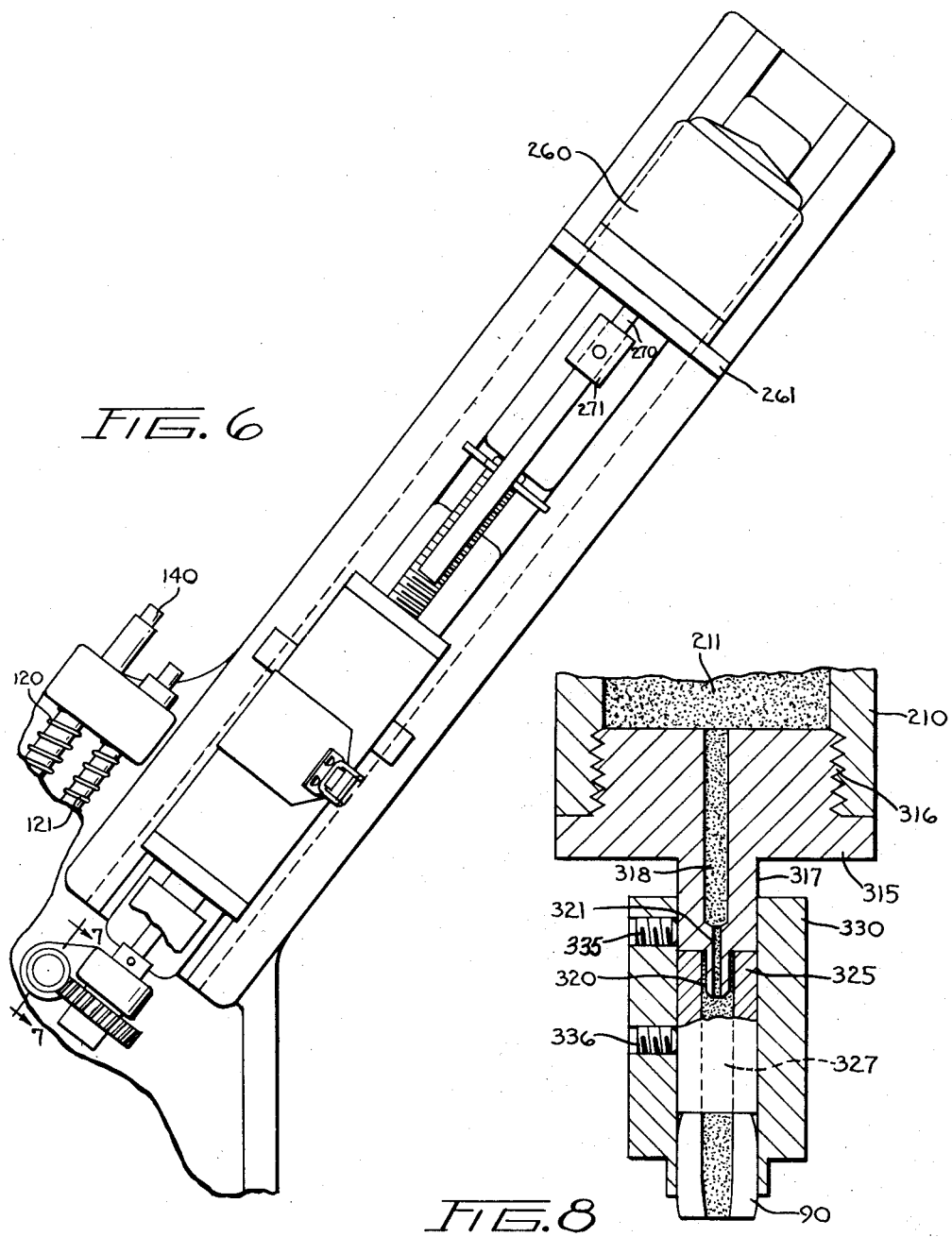
INVENTOR,
ROBERT LORING MARTIN
BY
Ostrolenk & Faber
ATTORNEYS Dec. 29, 1953     R. L. MARTIN     2,664,067
CAPACITOR COATING MACHINE
Filed March 13, 1951     9 Sheets-Sheet 7

INVENTOR.
ROBERT LORING MARTIN
BY
Ostrolenk & Faber
ATTORNEYS

Dec. 29, 1953     R. L. MARTIN     2,664,067
CAPACITOR COATING MACHINE
Filed March 13, 1951     9 Sheets-Sheet 8

INVENTOR.
ROBERT LORING MARTIN
BY
Ostrolenk & Faber
ATTORNEYS

Dec. 29, 1953     R. L. MARTIN     2,664,067
CAPACITOR COATING MACHINE
Filed March 13, 1951     9 Sheets-Sheet 9
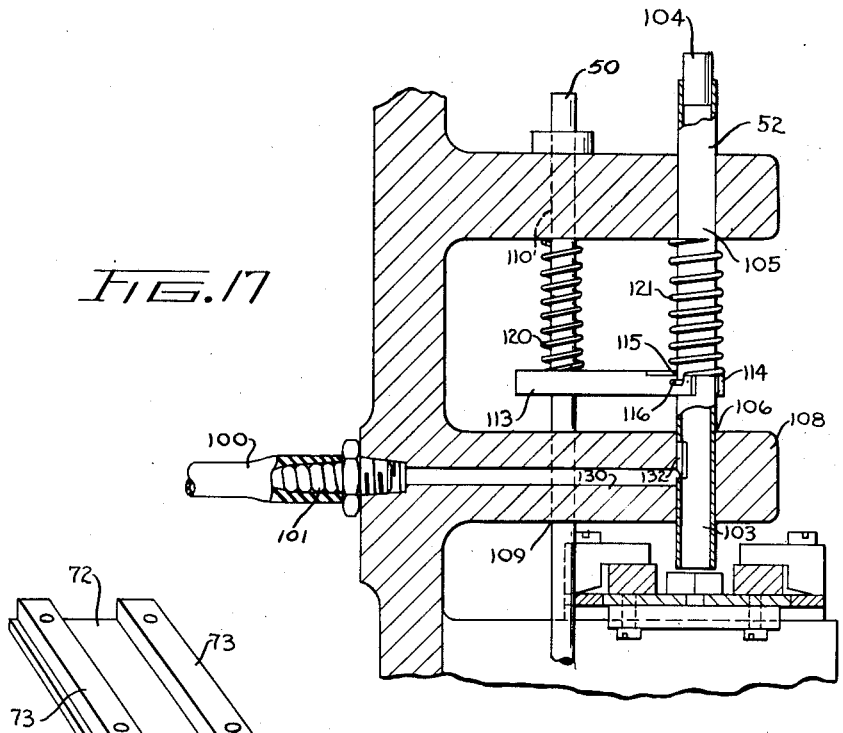
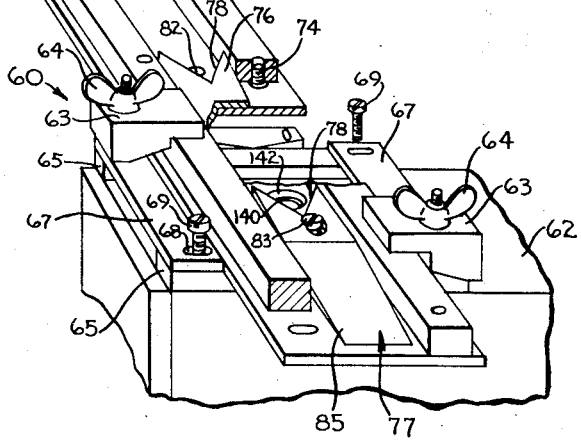
INVENTOR,
ROBERT LORING MARTIN
BY
ATTORNEYS

Patented Dec. 29, 1953

2,664,067

UNITED STATES PATENT OFFICE 2,664,067

CAPACITOR COATING MACHINE

Robert Loring Martin, Whittier, Calif., assignor to Solar Manufacturing Corporation, Los Angeles, Calif., a corporation of New York Application March 13, 1951, Serial No. 215,349

9 Claims. (Cl. 118—232)

My present invention relates to a machine and method for depositing a substantially invariable and constant quantity of silver coating of predetermined thickness on a disc of dielectric material in order to form a high capacity disc capacitor and more particularly relates to a machine which will automatically deposit an appropriate constant silver coating on dielectric discs in stepped regular sequence in such manner that a plurality of capacitors may be deposited in an appropriate hopper at one side of the machine and completed capacitors may be delivered on the delivery side of the machine without the necessity for manual intervention after preliminary adjustments prior to the beginning of the run have been made.

Essentially my invention contemplates a machine in which the dielectric discs slide down a track to a loading step. The disc may be fed singly or multiply in series to this loading step. Means are provided to raise the disc above the loading step at the appropriate interval, thus lifting the disc to a position where it may slide down the track to the next position which is the indexing step.

At the indexing step, mechanism is provided for raising the disc to the apparatus which applies the silver coating and rotating the disc in a predetermined manner in order to ensure a smooth application of the silver coating.

After the disc is thus coated, it is permitted to drop down and slide beyond the indexing step to an appropriate drying apparatus after which the disc may be inverted and fed through a similar machine and drying apparatus for coating of the other side.

The coating apparatus comprises essentially a dispenser with a fountain brush head and a follower driven by a motor to force the coating material out through the brush bristles.

The apparatus for moving the disc above the loader step and for holding the disc in position while it is moved up above the indexing step is energized by a vacuum system. The motor itself which drives the follower is energized and de-energized by a cam driven switch; and the timing of all of the elements, including the various means for moving the disc and the various apparatus for applying the coating or operating the motor follower and all other elements of the machine, is controlled by a single cam, the surface conformation of which predetermines not only the sequence of operations but the duration of each operation.

The primary object of my invention, therefore, is the provision of novel apparatus and means for depositing a metallic coating on a base in order to form a condenser.

Another object of my invention is the provision of apparatus, means and a method for forming condensers of the type wherein a dielectric is coated with an appropriate electrode material.

Another object of my invention is the provision of a novel apparatus for timing the delivery of a disc to the coating element of the machine, timing the coating operation and the removal of the disc from the position at which the coating operation is performed.

Another object of my invention is the provision of a novel cam controlled mechanism for supplying coating and delivering discs wherein all operations are controlled automatically in sequence and time from a single central control element.

Another object of my invention is the provision of novel apparatus for supplying coating and delivering discs wherein the movement of the discs through the machine is controlled by gravity and wherein the timing of the discs through the machine is controlled by vacuum operated members which engage the discs and wherein the entire sequence of operations including the energization of the vacuum members as well as of the other operating elements of the machine is controlled from a single control element.

Another object of my invention is the provision in a machine as above set forth of a control element comprising a single cam which operates valves or other control portions of a vacuum system and which also controls the operation of dispensing mechanism.

Another object of my invention is the provision of novel means for arranging two such machines in series with an appropriate conveyor and inverter between them so that both sides of a single disc may be coated successively without the intervention of any manual operations.

My novel machine is directed primarily to the formation of disc condensers wherein a coating of silver is deposited on a dielectric disc preferably made of titanium compounds or barium-strontium titanate or mica or any other well-known dielectric.

Since it is essential for accurate determination of capacity of the condenser to control the thickness and the area of the coating to a minute degree, an important object of my invention is the arrangement of my novel coating machine so that coating material may be deposited on successive discs in an exactly metered flow and spread with the utmost evenness thereon.

For this purpose I have found and my invention contemplates that the dispensing mechanism comprises a fountain brush which during the operation of the machine is essentially stationary, the fountain brush receiving an exactly metered flow of material from a dispensing mechanism wherein the dispensing mechanism comprises a piston operated by a screw which for each rotation of the screw will produce an exactly equal flow or deposit of material for each increment of downward movement of the piston.

The smoothness of the deposit and the regularity thereof is then obtained by rotation of the member which carries the disc into contact with the fountain brush. The regulation of the flow and of the thickness thereof is obtained not only by the amount of material which is deposited but by a vernier adjustment of the pressure of the fountain brush on the disc during the spreading of the material on the disc and by a vernier adjustment which predetermines exactly the interval during which the piston is moved down while the disc is in contact with the brush.

Thus, by the use of my invention it becomes possible to apply a smooth exactly metered and accurately measured coating to a dielectric disc in order to produce an appropriate condenser.

The foregoing and many other objects of my invention will become apparent in the following description and drawings in which:

Figure 6 is an enlarged elevation of the dispensing mechanism of Figures 3, 4, and 5.

Figure 7 is a plan view of a coated disc.

Figure 8 is an enlarged cross-sectional view of the brush applicator of Figures 3, 4, and 5, being particularly an enlargement of a fragmentary portion at the upper right center of Figure 5.

Figure 16 is an enlarged fragmentary view partially broken away showing the track arrangement of the machine of Figures 1, 3, and 4.

Figure 17 is a cross-sectional view taken from line 18—18 of Figure 3 looking in the direction of the arrows.

Figure 1:
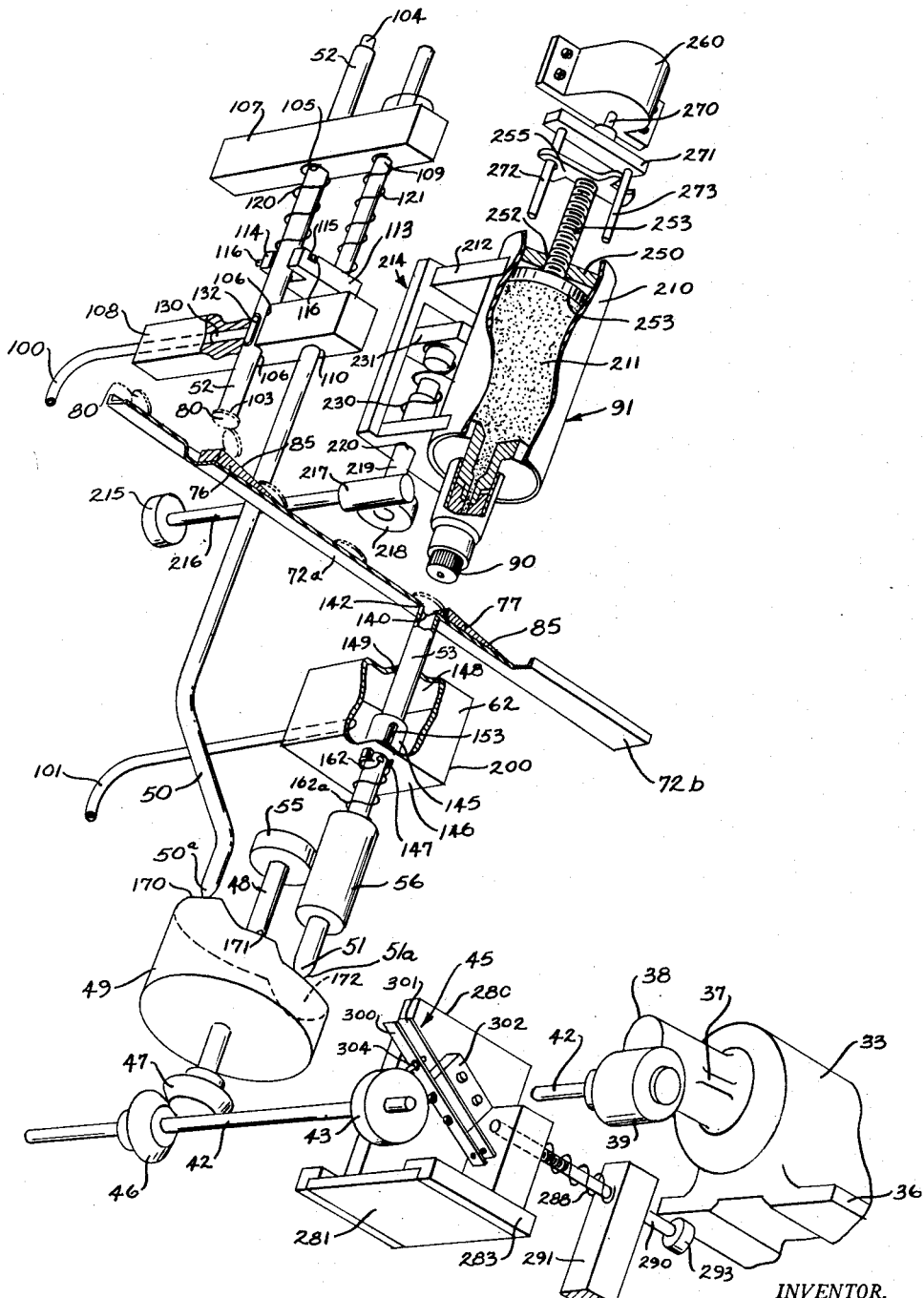
Figure 1 is a schematic exploded view partly broken away showing the operation and essential operating elements of my novel machine.

The construction and basic principle of operation of my novel machine may be understood from the schematic view of Figure 1.

For this reason, most of the description herein will relate primarily to Figure 1, although reference will be made to the other more detailed figures for further explanation of any structure referred to, and reference will be made to each of the other figures for the exact preferred conformation of each of the parts schematically shown in Figure 1.

Figure 3:
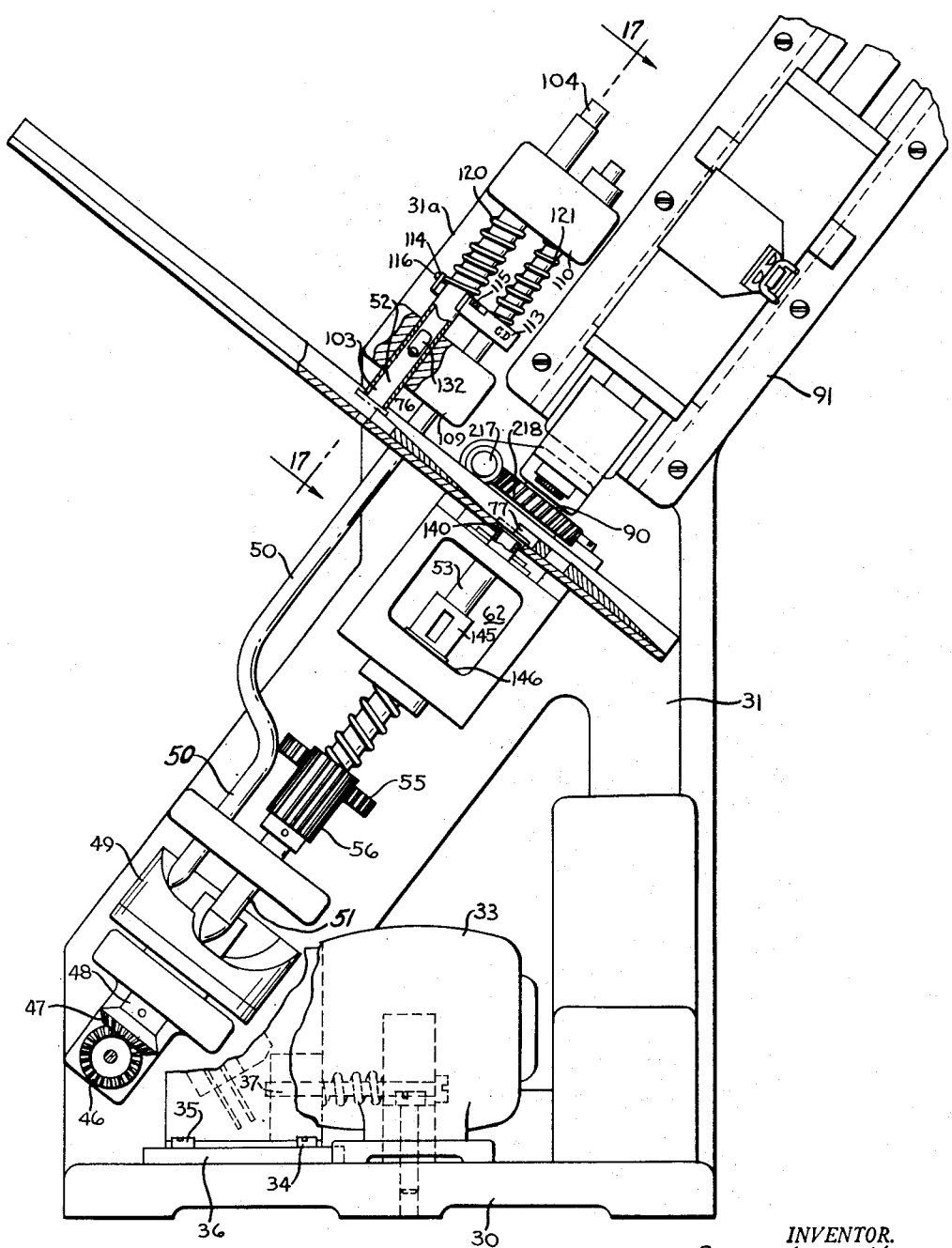
Figure 3 is an elevation of one side of my novel machine.
Figure 4:
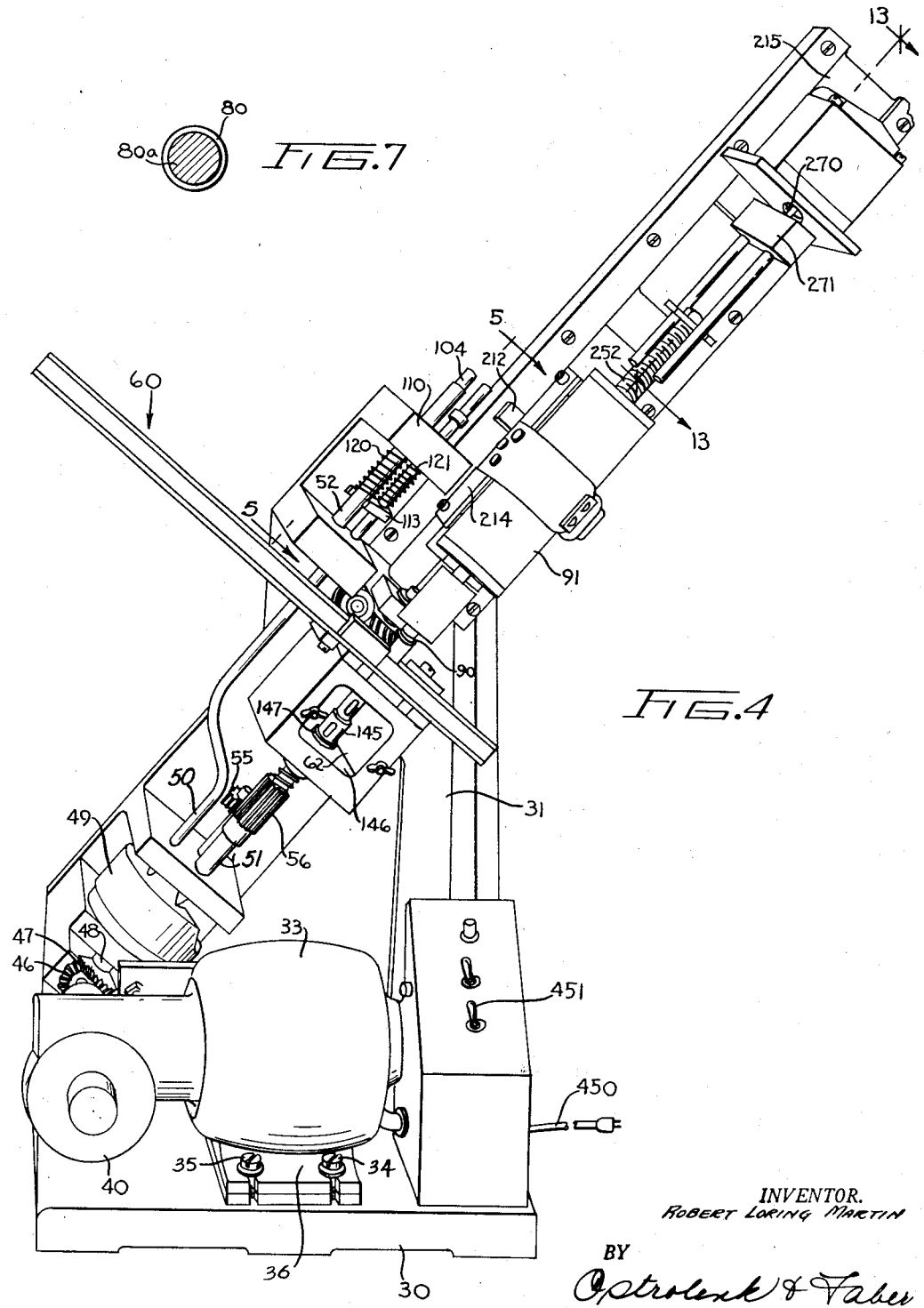
Figure 4 is an elevation of the side of my novel machine opposite to that of Figure 3.

Referring to Figures 3 and 4, the machine as a unit is mounted on a base 30 to which is secured in any appropriate manner the vertically arranged inverted V-slotted bracket 31. The base 30 and the bracket 31 support all of the parts. The main drive motor 33 is mounted on the base in any suitable manner as by the mounting bolts 34, 35 passing through slotted portions of the base 36 of the motor and into the main base or stand 30.

Figure 10:
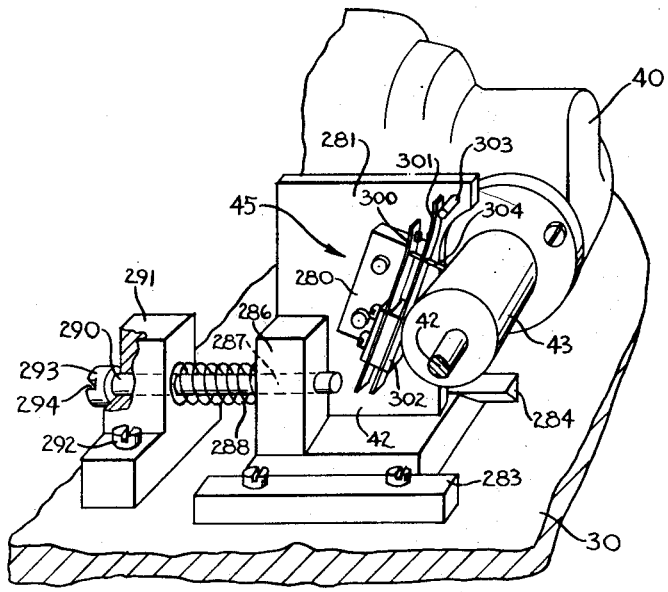
Figure 10 is an enlarged fragmentary view in perspective of the motor and control switch elements at the lower right portion of Figures 1, 3, 4 and 5.

Referring to Figure 1, the drive shaft 37 of motor 33 through the worm 38 and spiral gears 39 housed in the gear box 40, not in Figure 1 but shown in Figures 4 and 10, drives the main drive shaft 42. The main drive shaft 42 carries the eccentric cylinder 43 which operates the switch assembly 45 in the manner and for the purposes hereinafter described in connection with Figures 10, 11, and 12.

Then drive shaft 42 also drives bevel gear 46 which in turn drives the bevel gear 47 at the lower end of the substantially vertically arranged cam shaft 48.

Cam shaft 48 carries the main operating cam 49 keyed thereto and rotatable therewith. The gear train 46 and 47, shaft 48 and cam 49 are shown also in Figures 3, 4 and 5.

It should here be noted that all of the main elements of the machine are arranged so that the vertical axis of the machine is approximately at an angle of the order of 30° from the vertical in order to obtain the automatic feed of the discs hereinafter described.

The main operating cam 49 controls the vertical rise of the control rods 50 and 51 for the loading spindle 52 and the serving spindle 53, the function of which will hereinafter be more specifically described.

The cam shaft 48 also carries gear 55 which meshes with the long gear 56 on operating rod 51 for serving spindle 53, the gears 55—56 being in a 2:1 ratio also for purposes hereinafter described; but it should here be pointed out that as long as cam 49 is rotating, which is as long as motor 33 is operating, the connecting rod 51 is being rotated by shaft 48 and gear train 55, 56 at twice the speed of shaft 48 and cam 49 and in a reverse direction of rotation and that this rotation continues while the connecting rod 51 and the serving spindle 53 rise and fall in response to the operation of cam 49.

The machine is provided with a track assembly 60, hereinafter described in detail with reference to Figure 16. The track assembly 60 is secured at the upper surface of the vacuum chamber 62 which in turn is carried by bracket 32 (Figure 3).

The track assembly 60 is longitudinally adjustable for appropriate positioning with respect to the apparatus.

The longitudinal adjustment of track assembly 60 as seen in Figure 16 is obtained by securing the entire track assembly by means of the L-shaped clamps 63, 63 and wing nuts 64, 64 to appropriate lugs 65, 65 at the top of the vacuum chamber housing 62. The positioning bars 67, 67 held in place against the lugs 65 by the clamps 63 also serve to position the track assembly 60 angularly providing for some slight movement toward and away from the back of the machine of the track assembly 60 in order to ensure that perfect alignment is obtained. This result is achieved by means of the slots 68 in the bars 67 through which the bolts 69 pass and which serve to clamp the bars 67 in position to lock the track assembly in the appropriate location for the operations hereinafter described.

The track assembly 60 itself as seen in Figure 16 comprises a flat longitudinal base 72 having side guide bars 73, 73 secured thereto in any appropriate manner as by the bolts 74. The loader step 76 is secured to the bed 72 of the track assembly 60 at the appropriate location so that a disc 80 sliding down the track will be stopped by the loader step 76 in position to be engaged by the loading spindle 52.

The loading step 76 is similar in construction to the indexing step 77 and is provided with the V-shaped notch 78 similar to the identical V-shaped notch 77 of the indexing step 77 in order accurately to position the disc 80 in a central location with respect to the longitudinal axis of track bed 72 and immediately below the loading spindle 52.

Since the loading spindle 52 is hereinafter described will pick up the disc by vacuum, then in order to avoid any possible counterforce owing to the smooth surface of the disc resting on the smooth surface of the track bed 72, an air relief opening 82 is provided in the bed 72 of the track immediately below the position of the loading spindle 52.

The loading step unit 76 and the indexing step unit 77 are each secured in their respective positions by a bolt 83 passing through an appropriate opening therein and into a tapped opening in the track bed 72.

Essentially, it should be pointed out for purposes of the following description that the disc 80 slides down the bed 72 of the track assembly 60 to the loading step 76 where it is halted. Spindle 52 is then lowered and owing to a vacuum created in the hollow loading spindle 52 lifts up the disc 80 at that point.

When the spindle 52 rises well above the level of the loading step 76, the vacuum within the spindle 52 is cut off and the disc drops down on the outer chamfered surface 85 of the loading step 76 sliding down the intermediate section 72a of the track to the indexing step 77.

This last is the primary reason for the inclination or angle at which the operating parts of the machine are placed, so that the discs will slide off to the next position owing to gravity without the intervention or need of any other mechanical component to accomplish this purpose.

Referring again to Figure 1, at the next position at the indexing step 77, the serving spindle 53 thereafter rises, a vacuum being created at that time in the hollow serving spindle 53 to hold the disc 80 securely thereon while the serving spindle rises carrying the disc 80 up with it against the fountain brush 90 at the lower end of the dispensing assembly 91.

The serving spindle 53 is rotated through one revolution while it is in contact with the fountain brush 90 in order to achieve a smooth and regular deposit of coating material on the disc. Thereafter as the serving spindle 53 drops down and before its upper edge passes below the indexing step 77, the vacuum is released and the disc may drop off down the chamfered side 85 of the indexing step 77 to slide down track section 72b to the delivery point.

As pointed out before, the cam 49 controls the rise and fall of both the loading spindle 52 and the serving spindle 53 in timed sequence in order to perform the above operations. The cam 49 not only controls this rise and fall of the two spindles 52 and 53 but by means of the upward and downward movement of these spindles controls the air supply to the hollow interior of each of these spindles in order to have a vacuum in the spindles at the appropriate time interval and in order to release the vacuum at the appropriate time interval.

For this purpose, the operation of each of the spindles during its rise and fall must be first understood.

An appropriate pump or other device (not shown) is provided in order to evacuate the air. This device is connected in any appropriate manner to the air vacuum tubes 100, 101, the tube 100 being identified with the loading spindle 52 and its assembly and the tube 101 being identified with the vacuum chamber housing 62 and the serving spindle 53 and its assembly.

The loading spindle 52 is a hollow tube open at its lower end at 103 and provided with an appropriate plug 104 at its upper end in order to furnish an air-tight cell at its upper end. The loading spindle 52 slides vertically in guide openings 105 and 106 in the mounting blocks 107, 108 secured to the upper extension 31a shown in Figure 3 of bracket 31.

Connecting rod 50 also slides vertically in openings 109 and 110 of blocks 107 and 108, respectively. Connecting rod 50 has secured thereto in any suitable manner the lift bar 113, the outer bifurcated end 114 of which receives and passes on either side of the spindle 52. The tines of the bifurcated end 114 are provided with registering notches 115 which receive pins 116, 116 secured to and extending from the loading spindle 52. The details of and accompanying components of loading spindle 52 are clearly detailed in Figure 17.

The arrangement is such that whenever the connecting rod 50 is lifted by the cam 49 as hereinafter described, member 113 will lift the loading spindle 52. While in certain cases gravity may be relied on to drop the connecting rod 50 and the spindle 52 as the cam dwell drops, a more positive return action is achieved by the compression springs 120 and 121 for returning the spindle 52 and the connecting rod 50 to their lowered position as permitted by the cam.

Compression spring 120 is positioned by and surrounds the spindle 52 and exerts a compressive force between the upper guide block 107 and the bifurcated end 114 of arm 113 and also bears against the pins 116, thereby biasing the spindle 52 in a downward direction and providing independent spring loading to prevent fracture of the discs.

Compression spring 121 is compressed between the upper guide block 107 and arm 113 secured to the connecting rod 50, thereby biasing this rod in the downward direction.

By this means, therefore, assurance is obtained of the return of spindle 52 and the connecting rod 50 for operating the spindle 52 to the lowered position after they are raised by the cam 49 to an elevated position, thereby ensuring that the connecting rod 50 and the position of spindle 52 will always correspond to the desired variations in the dwell of the cam 49. A stop (see Figure 1) is provided on the upper end of connecting rod 51 and contacts guide block 107 in the down position enabling further control of the dwell and the length of the stroke of the loading spindle 52.

The guide block 108 in addition to being provided with the opening 106 is also provided with the longitudinal or axial opening 130 in which is located the vacuum tube 100, the said longitudinal opening 130 communicating with the opening 106 in which the longitudinal spindle moves.

The loading spindle 52 is provided with the elongated slot-like opening 132 in its side which registers with the vacuum opening 130. Consequently, the pump or other device connected to tube 100 is always, while the machine is in operation, drawing air from the interior of spindle 52, except in the elevated position of the spindle 52 when the disc 80 is intended to drop off the end.

Thus, when the spindle 52 moves down so that its lower end 103 engages a disc 80 held in position at the loading step 76 on the track assembly 60, the suction created in the interior of tube 52 through slot 132, tube 130 and tube 100 will serve to secure the disc 80 to the opening 103 of spindle 52.

This operation is enhanced by reason of the air relief furnished to the underside of the disc 80 by opening 82 in the bed of track 72 at the loading step position 76, described above with reference to Figure 16.

As the loading spindle 52 rises owing to the rise of connecting rod 50 which carries it up in response to the variation in the dwell of cam 49, the slot 132 in the loading spindle 52 also rises until at the upper portion of the travel of spindle 52 where the disc 80 may now drop off and slide further down the track 72 the upper end of the slot 132 moves above the upper surface of the guide block 108, thus exposing the upper end of the slot 132 in the spindle 52 to the atmosphere and thereby relieving the vacuum in the interior of the spindle 52 since a full air passage from the outer atmosphere to the vacuum source is at that moment provided.

Preferably, however, when the upper end of slot 132 emerges from the upper surface of guide block 108, the slot 132 is so dimensioned that the lower end will rise above the opening 130 so that the vacuum will be cut off from the interior of the tube 52, thereby permitting immediate restoration of atmospheric pressure in the interior of the tube 52 at that time to permit the disc 80 to drop off.

This relief of the vacuum in the interior of loading spindle 52 restores the interior of spindle 52 substantially to atmospheric pressure so that the disc 80 may now drop off the open end 103 of the spindle 52 by gravity.

Owing to the tilt of the machine, the direct downward drop of the disc 80 by gravity will permit it to clear the stop portion of the loading step 76 so that it will slide down the surface 85 of loading step 76 onto the section 72a of the track assembly 60 sliding further down until it reaches the stop position as defined by the indexing step 77.

After the disc 80 has dropped off at the upper portion of the travel of spindle 52, the spindle 52 begins its return toward the track bed 72. Before it reaches a position where the end 103 is below the top edge of the loading step 76, the slot 132 becomes completely encased or enclosed in opening 106 of guide block 108 and full vacuum is restored to the interior of the loading spindle 52 so that it may once again pick up a disc and follow through the same cycle.

The serving spindle 53 is also a hollow tube open at the upper end 140 and closed at its bottom end by the solid connecting rod 51 which acts as a cam follower on the cam 49. The serving spindle is connected to gear 56 with a taper pin to facilitate easy disassembly for cleaning. Spindles 52 and 53 are the same in construction.

While the loading spindle 52 is located above the track assembly 60, the serving spindle 53 is located below the track assembly 60 at the right-hand or lower end of track section 72a and in registry with the opening 142 in the track bed 72 through which the serving spindle 53 may slide vertically.

The opening 142 is located with respect to the indexing step 77 in such position that when the disc 80 is halted by the indexing step 77, the disc 80 will be directly above the opening 142 and hence directly above the opening 140 at the end of the serving spindle 53. The serving spindle 53 not only has a substantially vertical movement by which the entire unit is translated along its longitudinal axis but also has a rotative movement owing to the gear connection at 55—56 between the cam shaft 48 and the connecting rod 51.

This longitudinal or translatory movement and the rotary movement are both utilized to control the valving action for the evacuation of the interior of the loading spindle 53 through the vacuum chamber 62 in order to control not only the position of the disc on the serving spindle 53 but also to control the time when the disc will be released from the serving spindle 53 in order to drop down the section 72b of the track bed either to the delivery position for the coated disc or to a drier and conveyor which will set the coating and deliver the disc to an inverting device hereinafter described which will then prepare the disc for delivery to a similar machine for coating of the other side.

The air supply to the serving spindle 53 is controlled by a valve 145 which is a bushing secured in the lower wall 146 of the vacuum chamber 62. The lower wall 146 is provided with an air-tight opening 147 through which the spindle 53 may slide.

The upper wall 148 of the vacuum chamber 62 is also provided with an opening 149 through which the spindle 53 may slide.

Figures 5, 9:
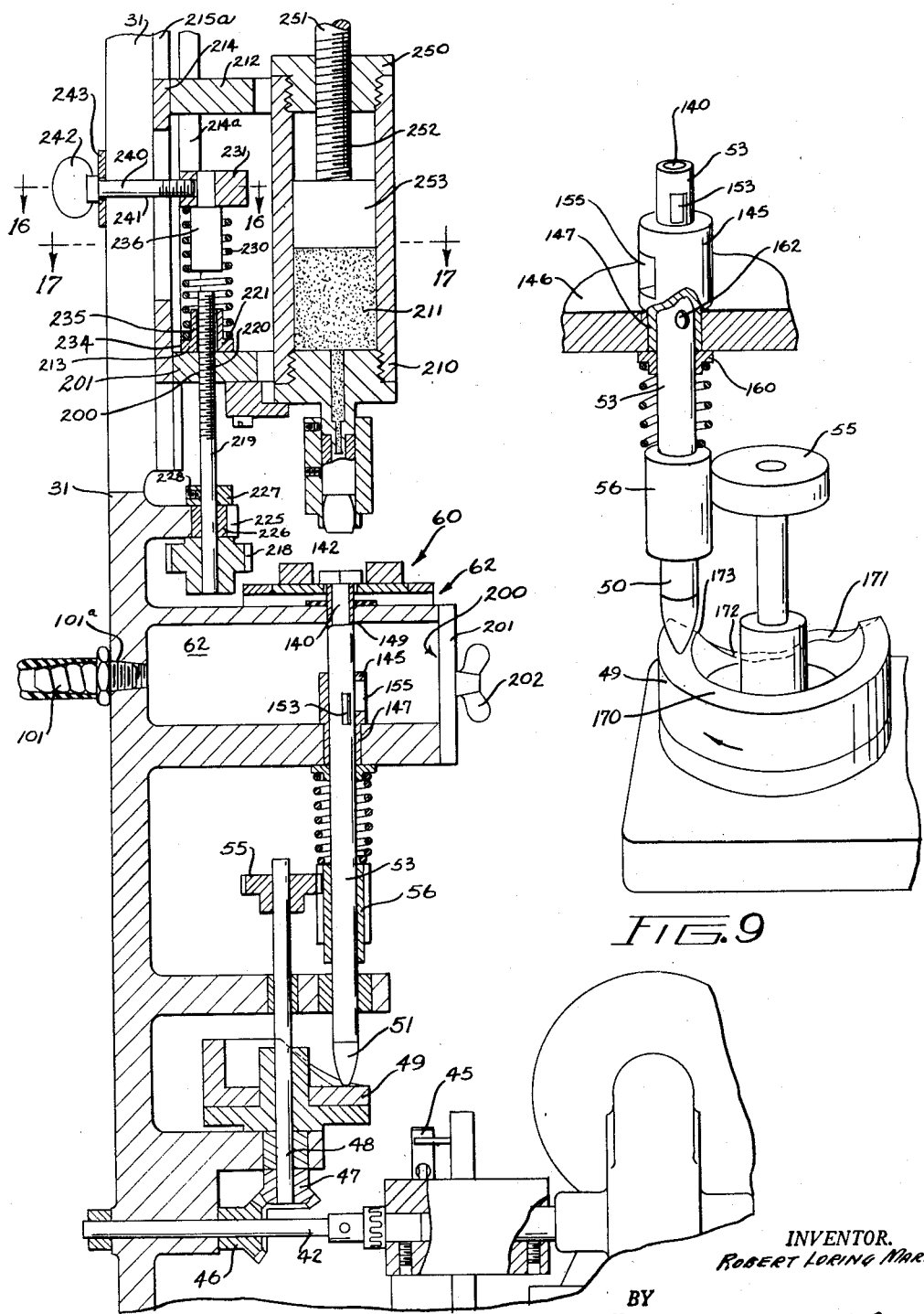
Figure 5 is a cross-sectional view taken on line 5—5 of Figure 4 looking in the direction of the arrows.
Figure 9 is an enlarged fragmentary view in perspective of the main operating cam which appears at the lower left side of Figures 1, 3, 4 and 5. This figure shows also the valve arrangement for the disc serving mechanism.

The construction of the valve arrangement is more particularly shown in Figures 5 and 9 which show, respectively, the lowered position of spindle 53 and the raised position of spindle 53. It will here be seen that the valve 145 is actually a bushing in the opening 147 in wall 146 of vacuum chamber 62. The spindle 53 is also provided with a slot 153 of limited radial dimension, and the valve bushing 145 is also provided with a slot 155 of similarly limited radial dimension.

The air in the interior of vacuum chamber 62 is constantly subject to evacuation owing to an appropriate vacuum pump or other means connected to the tube 101 which in turn is keyed to the vacuum chamber 62.

Consequently, whenever the spindle 53 is raised so that slot 153 is above the level of bushing 145, the interior of the spindle 53 is subjected to the vacuum which is present in the vacuum chamber 62. Whenever the spindle 53 is lowered so that the slot 153 is completely encased by the valve bushing 145, then the air in the interior of the spindle 53 is not subjected to the vacuum except at that portion of the rotation of the spindle 53 where the slot 153 of the spindle 53 registers with the slot 155 of the valve bushing 145, at which point in the rotation of the spindle 53 the interior of the spindle 53 is subject to the vacuum created in the vacuum chamber 62.

The spindle 53 in its fully lowered position is so arranged that its valve slot 153 is partly below the level of valve slot 155 of valve bushing 145 and as long as slot 153 does not register with slot 155, air is not drawn from the interior of spindle 53. The spindle 53 is supplied with a small opening 162 below the valve bushing 145, this opening 162 being closed when it engages the inner wall of the valve bushing 145 and being open when it is disengaged from this inner wall by spindle 53 being lowered to dwell 171, 172 of cam 49.

The side of bushing 145 is in close contact with the spindle except at the position where unloading of the spindle is to occur, at which point the air relief opening 162 is open to the atmosphere below the spring centering device. Spring 162a causes spindle 53 to follow cam 49.

Referring again to Figure 1, when the spindle 53 is in the lowered position, the air relief opening 162 is also in the lowered position and the interior of the spindle 53 is at atmospheric pressure, thereby permitting the disc 80 to slide down track section 72a freely until it comes to rest at the indexing step 77 in the positioning notch thereof over the opening 142.

At this time the spindle begins to rise owing to the operation of the main operating cam 49 in the manner hereinafter described, while the slot 153 moves opposite slot 155 in the valve bushing 145 so that the interior of spindle 53 is subjected to the vacuum in the vacuum chamber 62, thereby securing the disc firmly at the open end 140 of the serving spindle 53. As the spindle begins to rise, hole 162 is open to the atmosphere, but by virtue of the smaller area of hole 162 compared to slot 153 in spindle 53 exposed to opening 155 in bushing 145, sufficient vacuum is present in the interior of spindle 53 to secure the disc firmly at the open end 140 of the serving spindle 53.

As the spindle 53 now rises, the slot 153 thereof moves out of the valve bushing 145 into the vacuum chamber 62 and the interior of spindle 53 is now directly subject to the vacuum in vacuum chamber 62 so that the interior of the spindle 53 remains evacuated, thereby ensuring the securement of the disc 80 on the open end 140 of the spindle 53.

When the spindle 53 rises into engagement with the fountain brush 90 it is, of course, at that time being continuously rotated by the gear train 55—56 which are in 2:1 ratio so that the spindle 53 rotates two revolutions for a single revolution of the main operating cam 49. The dwell of the main operating cam 49 is so arranged that the spindle 53 is in the upper position where the disc 80 on the open end 140 of the spindle 53 is in contact with the fountain brush 90 for one complete revolution of the spindle 53.

Since the gear ratio between gears 55 and 56 is 2:1, it will be seen from a comparison of Figures 1 and 5 with Figure 9 that by making the upper dwell 170 of the main operating cam 49 occupy approximately 180° of the circumference of the main operating cam 49 that the spindle 53 when in the up position will rotate for one complete revolution owing again to the 2:1 ratio of 55 and 56 which makes the spindle 53 rotate at twice the speed of the main operating cam 49.

Since while the spindle 53 is in the up position against the fountain brush 90 it rotates for this complete revolution, the deposit of the coating material is not only ensured but an even spreading of the coating material by reason of the 360° rotation is also ensured prior to the dropping down of the spindle 53.

As the spindle 53 drops down after the coating operation has been performed, the slot 153 thereof enters into the valve bushing 145 and is fully enclosed by the valve bushing 145 before the upper end 140 of the spindle 53 moves below the upper surface of the indexing step 77.

Figure 2:
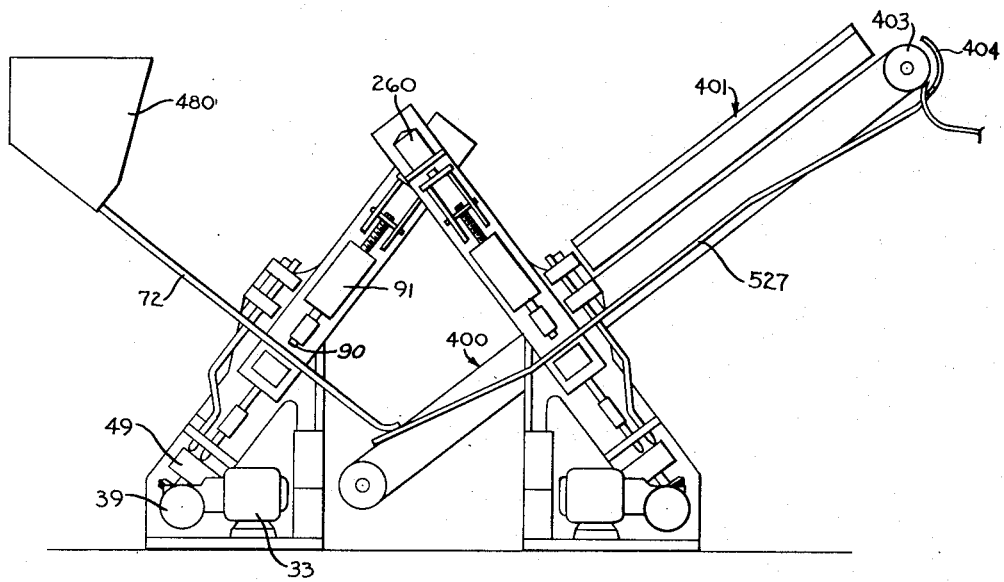
Figure 2 is a schematic view showing the arrangement of two of my novel machines in series for coating both sides of a disc.
Figure 2A:
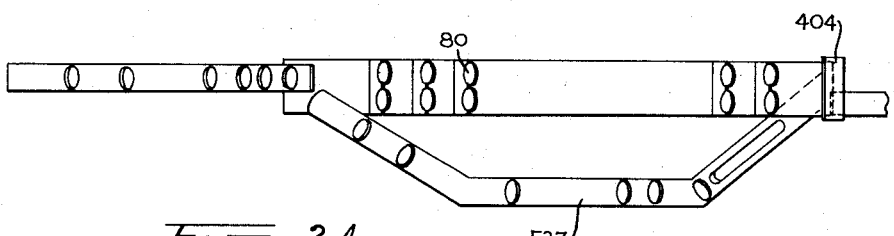
Figure 2a is a schematic top plan view of the apparatus of Figure 2 showing the path of movement of the discs.
Figure 2B:
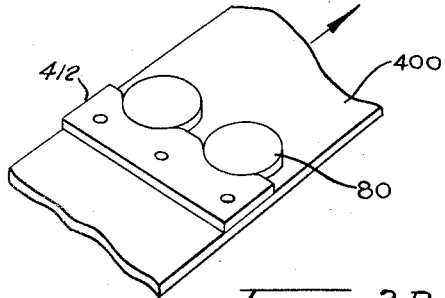
Figures 2b and 2c are details of the track mechanism of Figure 2.
Figure 2C:
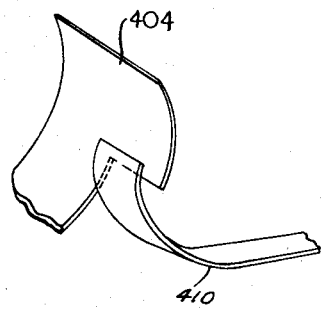

Since the vacuum is cut off by the entry of the slot 153 and into the valve bushing 145, the coated disc is now free to fall off onto the chamfered surface 85 of the indexing step 77 and move down track section 72b either to the delivery point or to the feed-in or supply point for a further operation as hereinafter described more particularly in connection with Figure 2.

In order to obviate any delay in the falling off of the disc 80 from the open end 140 of the spindle 53 which may result from any residual vacuum remaining in the tube 53 after the vacuum source is cut off by the entry of slot 153 into the valve bushing 145, the auxiliary opening 162 is provided at the lower portion of the serving spindle 53, this opening 162 being so arranged that it will move below the spring centering device 160 into the atmosphere, thereby permitting the entry of air into the spindle 53 and the equalization of the interior and exterior pressure so that gravity will be sufficient to permit the coated disc to drop off on the chamfered surface 75 of the indexing step 77.

This again is the reason for the tilt of the apparatus so that the angle of the direction of force exerted by gravity on the disc 80 will be at approximately 30° to the main axis through the spindle 53 and thus will permit the coated disc 80 to drop past the stop edge of the indexing step 77 so that the disc will be removed from the path of movement of the serving spindle 53 and this section of the apparatus will be prepared for the reception of a succeeding disc to be coated.

As previously referred to from time to time in this description, all of the operations are timed in appropriate sequence by the main operating cam 49.

Variations in the surfaces and dwell of the main operating cam 49 will now be understood from a description of the operations of the loading spindle 53 and the serving spindle 53 and their respective connecting or operating rods 50 and 51.

Essentially the loading spindle 52 must simply be raised sufficiently to lift the disc 80 above the loading step 76 and must be dropped in time not only to receive and raise the next disc but also in time to release the first disc which it raised so that this disc may drop down to be operated on by the serving spindle 53 and the fountain bushing 90.

The rather critical upward and downward movement of the loading spindle 52 is not occasioned by the loading operation per se but rather by reason of the fact that the upward and downward movement of the loading spindle 52 also controls the connection of the interior of the loading spindle 52 with the vacuum source at tube 100 and also controls the admission of air at atmospheric pressure to the interior of the loading spindle 52 in order to permit the disc 80 to drop down at the required moment.

However, the operation of the serving spindle 53 is critical not only with respect to the air evacuation from the interior and the restoration of atmospheric pressure for the purpose of permitting the disc to drop off but is also important and critical because of the fact that at least a single 360° revolution must be imparted to the serving spindle 53 at the top of its stroke.

Thus, it will be seen from a comparison of Figures 1, 5 and 9 that the main operating cam is provided with a 180° upward or elevated dwell 170 which corresponds to the fully raised position of each of the spindles 52 or 53.

The spacing of the operating or connecting rods 50 and 51 on opposite sides of the axis of rotation of the operating cam 49 permits the spindles to rise and fall in sequence rather than simultaneously and any appropriate relationship between the rise and fall of the two spindles may be established by varying the curvature or angle of either of the operating rods 50 or 51.

In this case, the operating or connecting rod 51 is shown as bent in a particular way to obtain the desired sequence wherein the up position of the spindle 52 corresponds to and occurs simultaneously with the down position of the spindle 53 and vice versa.

It will also be seen from a comparison of Figures 1, 5 and 9 that in addition to the 180° upward dwell 170 which will serve to maintain each spindle 52 and 53 successively in the up position for one-half of the revolution of the main operating cam 49 there is a succession of curved dwells 171, 172, 173. The lower position for the spindles corresponds to the lower dwell 171 of the cam 149 owing to the stop units on the spindles.

As the cam rotates, the operating rods 50, 51 riding with their lower ends 50a and 51a bearing on the upper surface of the cam move up and down, of course, in accordance with the curvature of the cam surface.

Starting with either spindle in the lower dwell 172, the spindle is first raised on the surface 173 to the upper 180° surface 170 and then rides down to the intermediate surface 171 and then again to the lower surface 172. The intermediate surface is primarily for the purpose of permitting the discharge of the disc from the serving spindle 53 at the completion of the coating operation and before the top 140 of spindle 53 drops below the indexing step 77.

By this means, therefore, a single operating cam controls not only the various vertical positions of the two spindles but owing to the fact that the vertical positions of the two spindles also control the condition of the air within the spindles 52 and 53, the single operating cam also controls the condition of the air within the two spindles.

The construction of the vacuum chamber 62 itself may more readily be seen in Figure 5 and by a comparison of Figures 1 and 4 therewith.

The vacuum chamber 62 is preferably made as part of the same casting as the support bracket 31 with an opening 101a at the rear to which the vacuum hose 101 may be secured and a front opening 200 which permits the unit to be formed by a casting operation and which provides access to the interior valves for manufacture, maintenance and repair.

Referring to Figure 5, the front opening 200 of vacuum chamber 62 is closed by an appropriately gasketed air-tight cover 201 held in place by wing nuts 202 on the threaded studs extending from the edges of the walls of the vacuum chamber 62.

The dispensing mechanism 91 is shown schematically in Figure 1 and in greater detail in Figures 6, 7 and 8. Some of the elements of the dispensing mechanism may also more readily be seen in Figures 5, 13, 14, and 15.

Referring to Figure 5, the dispensing mechanism 91 comprises a container 210 containing the material 211 to be coated on the disc. The container 210 is carried and supported by the extensions 212 and 213 of the slide block 214 which rides in the vertical track extension 215a.

The spiral gear 218 is mounted on the screw 219 in threaded relation with the tapped opening 200 on the lower arm or extension 213 which supports the dispensing container 210.

The screw 219 is rotatably mounted in arm 225 carried by the stationary bracket 31 and is freely rotatable in the bearing 226 of arm 225 without having any longitudinal movement with respect thereto, its longitudinal movement being restricted by the spiral gear 218 on the underside and the collar 227 on the upper side held in position by the set screw 228.

Referring again to Figure 1, the slide block 214 is vertically adjustable by means of manual adjustment knob 215 which drives shaft 216 carrying secured thereto the worm gear 217 meshing with the spiral gear 218.

Referring again to Figure 5, the entire slide block 214 is held firmly against the threads of screw 219 by the compression spring 230 captured between the clamping arm 231 and the spring centering device 221. The spring centering device 221 which is secured to the arm 213 is provided with the shoulder 234 which provides a lower bearing for the compression spring 230, the cylindrical extension 235 of the nut providing a locating spindle for the spring 230.

The clamping arm 231 has a locating spindle 236 extending downwardly for the compression spring 230. The clamping arm 231 is in screw thread relation with the clamping screw 240 mounted in the stationary opening 241 of the support casting 31, the said clamping screw 240 having a manually rotatable head 242 and a clamping plate 243.

The screw 240 while it is located in the bracket 31 passes between the side rails 214a of the slide member 214 with the clamping arm 231 extending across these rails.

Consequently, after the position of the entire dispensing mechanism has been determined by manual rotation of knob 215, the compression spring 230 serves to hold the dispensing mechanism in appropriate position against one side of the screw threads and permits adjustment of the entire dispensing mechanism without play in the threads of screw 219.

If necessary, a scale may be provided with the bracket and an index pointer on the slide member 214 in order to provide a determination of the required position.

The dispensing cylinder 210 is provided with an appropriate top closure 250 having a tapped opening 251 through which the follower screw 252 is mounted, the said follower screw 252 being engaged with the threads of the tapped opening 251. The lower end of the follower screw 252 inside the dispenser 210 is provided with the piston lug follower 253.

Figure 13:
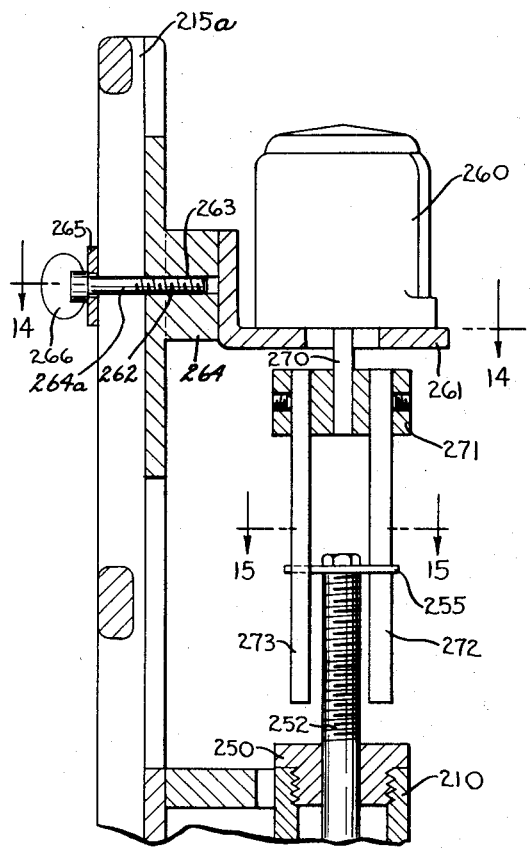
Figure 13 is an enlarged cross-sectional view taken from line 13—13 of Figure 4 looking in the direction of the arrows showing the dispenser motor mount.
Figure 14:
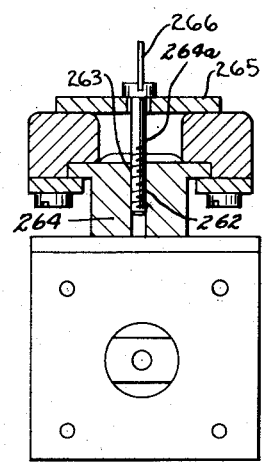
Figure 14 is a cross-sectional view taken from line 14—14 of Figure 13 looking in the direction of the arrows.
Figure 15:
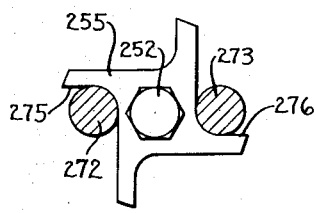
Figure 15 is a cross-sectional view taken from line 15—15 of Figure 13 looking in the direction of the arrows.

The upper end of the screw 252 is, as seen especially in Figures 13 and 15, provided with the driving cross arm 255 which is secured and keyed thereto in any suitable manner so that rotation of cross arm 255 will result in rotation of screw 252.

A motor 260 is mounted on plate 261 which is secured to the upper end of the track 245. The securement of plate 261 is vertically adjustable by reason of the fact that the securement of the plate 261 at the upper end of track 245 is by the clamping screw 262 which engages in the tapped opening 263 of clamping extension 264 of plate 261 to which it is secured, the clamping screw 262 passing through and being freely rotatable in opening 264a of the track bed and having the external clamping plate 265 and manually rotatable head 266 as shown also in Figure 14.

The motor 260 and its plate 261 are thus vertically adjustable in order to ensure that at all times there will be a driven connection as hereinafter described between the motor and the follower screw 252. The shaft 270 as shown also in Figure 6 of motor 260 drives the cross bar 271 which is connected thereto. The cross bar 271 is provided adjacent its outer ends with the drive rods 272 and 273, each of which registers against a ledge 275, 276 shown in Figure 15 of the cross bar 255 secured to the screw 252.

On rotation of the motor shaft 270 in a clockwise direction with respect to Figure 15, the follower screw 252 will be rotated in a direction to move the follower 253 down in order to compress the material 211 in the dispenser container 210 described above with reference to Figure 1.

The cover 250 is arranged so that when desired it may be removed and the entire follower assembly may be raised up to a new or start position while the dispenser is filled with the material once more and the cover 250 is then reinverted and locked in position.

As the motor 260 is energized, it rotates by means of the cross bar 271 and drive rods 272 and 273 and the cross bar 255 of the follower screw 252 to rotate the follower 253 described above downwardly to compress the material 211 in the dispenser container or cylinder 210.

It is desirable that an exactly predetermined amount of coating material be fed out through the fountain brush 90 and that this feeding operation occur in timed relation to the rise of the serving spindle 53 into contact with the fountain brush 90 is previously described.

Figure 11:
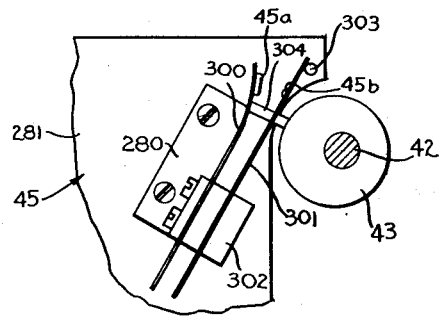
Figures 11 and 12 illustrate schematically the operation of the control switch of Figure 10.
Figure 12:
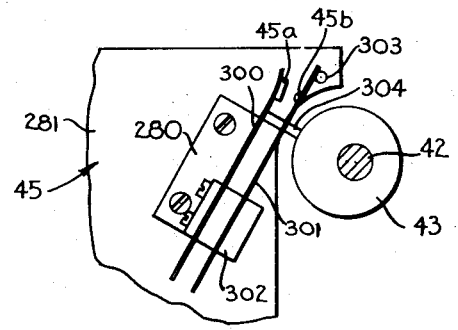

For this purpose, the motor 260 is in circuit with the switch assembly 45 driven by the eccentric 43 on the shaft 42. As shown in Figures 10, 11 and 12, switch 45 is so arranged that when closed it will energize the motor 260 to drive it in a direction to move the follower 253 downwardly, thereby compressing the material 211 and feeding it out through the fountain brush 90.

Referring now to Figures 10, 11, and 12, the eccentric 43 is so arranged that it will close the switch contacts 45 when the cam follower surface 51a of the drive rod 51 of the serving spindle 53 is at the upper surface 170 of the main operating cam 49.

At this time an exactly predetermined amount of material will be fed out through the fountain brush 90 for a period of time as determined by the length of time that the contacts 45a and 45b of the switch 45 are engaged. This length of time may be predetermined either by the particular curvature of the eccentric member 43 or by the location of the switch contacts 45a and 45b which will determine the portion of the cycle during which they are engaged.

I have found that it is simpler to adjust the location of the switch member 45 than to change the curvature of the eccentric. Accordingly, the switch member 45 is mounted on the vertical support plate 280 which in turn is mounted on slide block 281 adapted to slide toward and away from the eccentric.

When the slide block 281 is moved away from the eccentric, then the switch contacts 45a and 45b will be engaged for a relatively large portion of the cycle. When the switch elements are moved closer to the eccentric, then the contacts will be engaged for only a relatively small portion of the cycle.

In order to obtain this adjustment, the slide block for the switch contact 45 is mounted in tracks 283, 284 on the base 30 of the machine and is provided with an upwardly directed extension 286 having the tapped opening 287 therein engaged by the adjusting screw 288 which rotates freely but is not permitted to have any longitudinal movement with respect to opening 290 in the stationary block 291 secured in any suitable manner as by bolts 292 to the base of the machine.

The head 293 of screw 288 may be rotated in any suitable manner either by a screw driver in slot 294 or it may be made of such a shape as to be adjustable manually in order to move the switch support block 281 toward and away from the eccentric.

Again an appropriate scale may be provided with one of the tracks 283 and an index on the slide block 281 to indicate an appropriate setting.

Thus, by the use of the adjusting knob 293, the motor 260 may be arranged to be energized for a relatively smaller or greater portion of the 180° elevated dwell 170 of the main operating cam 49, thereby controlling exactly the amount of material deposited on the disc.

The contacts themselves are essentially contact elements mounted on leaf springs 300, 301 held by the insulating block 302 on the switch support block 280, the leaf spring 301 being located in position by the stop 303 and the leaf spring contact element 300 having the insulating cam follower 304 extending therefrom and resting against the surface of eccentric 43.

This accurate adjustment is extremely necessary as previously pointed out in the case of coated disc condensers since the coating itself may vary in thickness from .0001 inch to .001 inch and variations of even 1% in the thickness of the coating may vary the capacity appreciably.

Regulation of the thickness of the coating is, of course, also achieved by the conformation of the fountain brush 90 and by the construction of the lower surface of the dispenser container 210 which carries the fountain brush 90.

As shown in Figure 8, instead of filling the dispenser 91 from the top, the bottom closure 315 may be made removable by being formed in screw thread relation at 316 of the side wall of dispenser 210. The center of closure member 315 is provided with a longitudinal opening 318 extending down into the neck extension 317 of the closure 315. The extension 317 is turned down to form the nipple 320 having the small metering bore 321 which also provides a regulation of the flow of the material 211 and hence assists in controlling the thickness of the coating.

The fountain brush 99 is carried by the tube 325 which is a sliding fit over the nipple extension 320 and is provided with a longitudinal opening 327 extending into the bristles of the brush 90. The tubular member 325 of the fountain brush 90 is mounted over the nipple 320 and is held in position by the clamping sleeve 330 which slides over extension 317 and receives the tubular member 325 and is retained in position and retains the fountain brush tube 325 in position in turn by means of the set screws 335 and 336, respectively.

As seen in Figures 2, 2a, 2b and 2c, after the condenser disc has been coated on one side, it may drop off onto a continuously movable double width conveyor 400 having disc carrying slats 412 adapted to carry the discs in pairs. The left-hand side of each slat receives the coated disc from the first machine. The right side picks up the coated disc from the second machine and delivers it. Conveyor 400 moves the discs through a drier 401 in order to set the coating. At the top run of the conveyor 400 at 403, the disc may fall off into an inverter plate 404 which is appropriately curved to turn the disc 80 upside down and drop it off on the track 527 of a second identical machine which will treat the other side of the disc in the same manner as the first machine and then deliver the disc once more to the other side of conveyor belt 400 which in turn will carry the disc through the same drier 401 and then to the final delivery point. Since this second delivery is at the right side of belt 400, the finished disc will drop from the inverter to the delivery chute 410.

Thus, it will be seen that in the utilization and operation of my machine, a disc need merely be dropped into a hopper 480 so arranged that the discs will enter individually into the track 72 and then slide down either singly or in multiple one after the other to the loading step 76, as shown in Figure 1.

At that point the disc will be lifted up and transferred to section 72a of the track 72 in timed relation to be brought to a stop at the indexing step 77 where it will then be coated by the apparatus already described.

At the completion of the coating operation, the disc will drop past the indexing step 77 to the delivery point of the first machine or to a conveyor which will carry it through a drying apparatus and then to an inverter for delivery of the same disc to a second machine which will coat the other side.

As previously pointed out, since the coating thickness is extremely critical in determining the exact capacity of the condenser thus to be coated, the adjustments of the dispenser and coating applying apparatus are extremely critical and that is the reason for the micrometer type of adjustments of the switch 45 and the dispenser support block 214 as well as the provision of the metering opening 321 just above the fountain brush 90, all described above.

As seen in Figures 3, 4 and 5 which show the commercial actually usable embodiment of the machine, the machine is very simple in construction and in operation may be so arranged that it is readily available for inspection, adjustment, replacement and repair of the parts.

The only electrical circuit requirements necessary are shown in Figure 4. They consist of a plug-in line cord 450 which will energize the motor 260, an appropriate on-off switch 451 and an appropriate electrical connection from the line cord 450 through the control switch 45 to the motor 260. Two additional switches are used —one a normal on-off control of the silvering mechanism in series with switch 45 to interrupt the flow of silver when the machine is stopped and an on-off switch in parallel with switch 45 to permit manual control of the feed of silver to load the brush 90 when starting the machine.

In addition to these electrical connections, it is only necessary to provide the tube 101 as shown in Figure 5 which is connected to the vacuum chamber 62 and the tube 100 which is connected to block 108 as shown in Figure 17.

Thus, in setting up the machine it is only necessary to connect the line cord 450 of Figure 4 and connect the tube 101 of Figure 5 and the tube 100 of Figure 17 to an appropriate pump or other means for generating a vacuum or exhausting the air from the spindles 52 and 53.

The disc 80 is shown in Figure 7 where 80a is the silvered portion.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. An automatic disc coating machine comprising an input hopper at one end and an output chute at the other end of said coating machine; an inclined track connecting said hopper and said chute, said track comprising a loading step and an indexing step; means for raising said disc above said loading step, thereby allowing it to slide down said track to said indexing step; means for raising and rotating said disc at said indexing step; power operated means for applying a given amount of coating material to said disc at said indexing step while said disc is in its raised position, and a single cam means adapted to operate said raising, rotating and coating means.

2. An automatic disc coating machine comprising an input hopper at one end and an output chute at the other end of said coating machine; an inclined track connecting said hopper and said chute, said track comprising a loading step and an indexing step; means for raising said disc above said loading step, thereby allowing it to slide down said track to said indexing step; means for raising and rotating said disc at said indexing step; means for applying a given amount of coating material to said disc at said indexing step comprising a dispenser, a fountain brush head, a motor, a follower coupled and driven by said motor for forcing the coating material from the interior of said dispenser through said fountain brush head and governing means comprising a single cam and a plurality of cam followers connected to the said raising, rotating and coating means, said governing means being also connected to said motor.

3. An automatic disc coating machine comprising an input hopper at one end and an output chute at the other end of said coating machine; an inclined track connecting said hopper and said chute, said track comprising a loading step and an indexing step; means for raising said disc above said loading step, thereby allowing it to slide down said track to said indexing step comprising a vacuum operated suction member; means for raising and rotating said disc at said indexing step; means for applying a given amount of coating material to said disc at said indexing step comprising a dispenser, a fountain brush head, a motor, a follower coupled and driven by said motor for forcing the coating material from the interior of said dispenser through said fountain brush head, and a single cam means adapted to operate said raising, rotating and coating means.

4. An automatic disc coating machine comprising an input hopper at one end and an output chute at the other end of said coating machine; an inclined track connecting said hopper and said chute, said track comprising a loading step and an indexing step; means for raising said disc above said loading step, thereby allowing it to slide down said track to said indexing step; means for raising and rotating said disc at said indexing step; means for applying a given amount of coating material at said indexing step comprising a dispenser, a fountain brush head, a motor, a follower driven by said motor for forcing the coating material from the interior of said dispenser through said fountain brush head; said follower comprising a screw coupled to said motor, producing equal volume displacements for each rotation of said screw; and a single cam means adapted to operate said raising, rotating and coating means.

5. An automatic disc coating machine comprising an input hopper at one end and an output chute at the other end of said coating machine; an inclined track connecting said hopper and said chute, said track comprising a loading step and an indexing step; means for raising said disc above said loading step, thereby allowing it to slide down said track to said indexing step; means for raising and rotating said disc at said indexing step; means for applying a given amount of coating material at said indexing step comprising a dispenser, a fountain brush head, a motor, a follower driven by said motor forcing the contents of said dispenser through said fountain brush head; said follower comprising a screw coupled to said motor, producing equal volume displacements for each rotation of said screw; said fountain brush including a vernier adjustment means for controlling the operation of the said motor, said vernier adjustment means providing regulation for the thickness of the coating applied by the said head, and a single cam means adapted to operate said raising, rotating and coating means.

6. An automatic disc coating machine comprising movable components; a cam adapted to operate said movable components, and a vacuum system for raising a disc; said movable components comprising two control rods, a hollow loading spindle and a serving spindle; means connecting said vacuum system to said hollow loading spindle for cutting the vacuum on and off as said hollow spindle is moved vertically, connecting means between said loading spindle and one of said control rods for moving said loading spindle simultaneously with said control rod, the second of said control rods being connected to said serving spindle, means for coating said disc, said second control rod moving said serving spindle against and pressing the disc against said coating means.

7. An automatic disc coating machine comprising movable components; a cam completely governing the motion of said movable components; a vacuum system essentially governing the substantially vertical motion of said disc; said movable components comprising two control rods, a loading spindle and a serving spindle; the first of said control rods governing the motion of said loading spindle, a long gear connected to said second control rod and governing the circular motion of said serving spindle; said cam controlling the vertical rise of said control rods; a cam shaft and cam gear said cam shaft carrying said cam, said cam gear being attached at the top of said cam shaft and meshing with said long gear in a 2:1 gear ratio; and a track assembly substantially 30° from the horizontal longitudinally adjustable with respect to the rest of said coating machine; said vacuum system comprising a vacuum chamber, said track assembly being mounted on said vacuum chamber and comprising a flat longitudinal base, two side guide bars, means for securing said guide bars to said base, a loading step and an indexing step secured to said base; said loading step and said indexing step having a partially open V-shaped notch centrally located with respect to the longitudinal axis of said track, said loading spindle being positioned directly above said V-shaped notch of said loading step; said indexing spindle being located directly below said partially open V-shaped notch of said indexing spindle, means for coating said disc, said means being positioned axially with respect to said serving spindle, said serving spindle moving axially through action of said cam and circularly through action of said long gear and cam shaft and causing said disc to be pressed against said coating means while in rotational motion.

8. An automatic disc coating machine comprising movable components; a cam completely governing the motion of said movable components; a vacuum system essentially governing the substantially vertical motion of said disc; said movable components comprising two control rods, a loading spindle and a serving spindle; the first of said control rods governing the motion of said loading spindle, a long gear connected to said second control rod and governing the circular motion of said serving spindle; said cam controlling the vertical rise of said control rods; a cam shaft and cam gear said cam shaft carrying said cam, said cam gear being attached at the top of said cam shaft and meshing with said long gear in a 2:1 gear ratio; a track assembly substantially 30° from the horizontal longitudinally adjustable with respect to the rest of said coating machine; said vacuum system comprising a vacuum chamber, said track assembly being mounted on said vacuum chamber and comprising a flat longitudinal base, two side guide bars, means for securing said guide bars to said base, a loading step and an indexing step secured to said base; said loading step and said indexing step having a partially open V-shaped notch centrally located with respect to the longitudinal axis of said track, said loading spindle being positioned directly above said V-shaped notch of said loading step; said indexing spindle being located directly below said partially open V-shaped notch of said indexing spindle, and means for applying a given amount of coating at said indexing step comprising a dispenser, a fountain brush head, a motor, a follower driven by said motor forcing the coating material from the interior of said dispenser through said fountain brush head; said fountain brush head being directly above said V-shaped notch of said indexing step.

9. An automatic disc coating machine comprising movable components; a cam completely governing the motion of said movable components; a vacuum system essentially governing the substantially vertical motion of said disc; said movable components comprising two control rods, a loading spindle and a serving spindle; the first of said control rods governing the motion of said loading spindle, a long gear connected to said second control rod and governing the circular motion of said serving spindle; said cam controlling the vertical rise of said control rods; a cam shaft and cam gear said cam shaft carrying said cam; said cam gear being attached at the top of said cam shaft and meshing with said long gear in a 2:1 gear ratio; a track assembly substantially 30° from the horizontal longitudinally adjustable with respect to the rest of said coating machine; said vacuum system comprising a vacuum chamber, said track assembly being mounted on said vacuum chamber and comprising a flat longitudinal base, two side guide bars, means for securing said guide bars to said base, a loading step and an indexing step secured to said base; said loading step and said indexing step having a partially open V-shaped notch centrally located with respect to the longitudinal axis of said track, said loading spindle being positioned directly above said V-shaped notch of said loading step; said indexing spindle being located directly below said partially open V-shaped notch of said indexing spindle, means for applying a given amount of coating at said indexing step comprising a dispenser, a fountain brush head, a motor, a follower driven by said motor forcing the coating material from the interior of said dispenser through said fountain brush head; said fountain brush head being directly above said V-shaped notch of said indexing step, and an adjustable switch member controlling the operation of said motor of said means for applying a coating.

ROBERT LORING MARTIN.

References Cited in the file of this patent

UNITED STATES PATENTS

| Number | Name | Date |
|---|---|---|
| 313,064 | Eddy et al. | Mar. 3, 1885 |
| 478,031 | Stone | June 28, 1892 |
| 733,968 | Jenner | July 21, 1903 |
| 928,172 | Bernardin | July 13, 1909 |
| 1,483,120 | Schoenwetter | Feb. 12, 1924 |
| 2,166,268 | Simmons | July 18, 1939 |
| 2,252,269 | McQuown | Aug. 12, 1941 |
| 2,380,212 | Blaisdell | July 10, 1945 |
| 2,575,007 | Deland | Nov. 13, 1951 |